United States Patent
Shanks et al.

(10) Patent No.: US 10,144,382 B2
(45) Date of Patent: Dec. 4, 2018

(54) STEERING COLUMN SYSTEM FOR VEHICLE OCCUPANT SAFETY

(71) Applicants: Hyundai America Technical Center, Inc, Superior Township, MI (US); Hyundai Motor Company, Seoul (KR); Kia Motors Corporation, Seoul (KR)

(72) Inventors: Kurt Shanks, Ann Arbor, MI (US); Barry Phillips, Brooklyn, MI (US); David Gotwals, Howell, MI (US)

(73) Assignees: Hyundai America Technical Center, Inc., Superior Township, MI (US); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 476 days.

(21) Appl. No.: 14/969,276

(22) Filed: Dec. 15, 2015

(65) Prior Publication Data
US 2017/0166155 A1    Jun. 15, 2017

(51) Int. Cl.
*B60R 21/203* (2006.01)
*B62D 1/19* (2006.01)
(Continued)

(52) U.S. Cl.
CPC ........ *B60R 21/203* (2013.01); *B60R 21/2032* (2013.01); *B62D 1/105* (2013.01);
(Continued)

(58) Field of Classification Search
CPC ... B60R 21/2032; B60R 21/203; B62D 1/105; B62D 1/192; B62D 1/19
(Continued)

(56) References Cited

U.S. PATENT DOCUMENTS 3,801,123 A * 4/1974 Jira ..................... B60R 21/2032
                                                      280/731
3,910,597 A * 10/1975 Seko ................... B60R 21/2032
                                                      224/276
(Continued)

FOREIGN PATENT DOCUMENTS

JP    2000-153746 A    6/2000
JP    2005-504681 A    2/2005
(Continued)

*Primary Examiner* — Keith J Frisby
(74) *Attorney, Agent, or Firm* — Mintz Levin Cohn Ferris Glovsky and Popeo, P.C.; Peter F. Corless

(57) ABSTRACT

A steering column system of a vehicle includes: a rotatable, hollow steering shaft that has a proximal end attached to a steering wheel and is configured to transfer rotational input at the steering wheel to a steering rack of the vehicle; a stationary driver-side airbag (DAB) shaft that is surrounded by the steering shaft and extends along the steering shaft; and a DAB module that contains an airbag and is fixedly mounted to a proximal end of the DAB shaft within a region of the steering wheel. The airbag contained in the DAB module is formed to have a substantially circular center chamber and a pair of side extension chambers, one of the side extension chambers disposed on a right side of the center chamber, and the other of the side extension chambers disposed on a left side of the center chamber.

27 Claims, 10 Drawing Sheets

(51) Int. Cl.
  *B62D 3/12* (2006.01)
  *B62D 1/10* (2006.01)
  *B60R 21/239* (2006.01)
  *B60R 21/268* (2011.01)
  *B60R 21/00* (2006.01)

(52) U.S. Cl.
  CPC ............ *B62D 1/192* (2013.01); *B62D 1/195* (2013.01); *B62D 3/12* (2013.01); *B60R 21/239* (2013.01); *B60R 21/268* (2013.01); *B60R 2021/0004* (2013.01); *B60R 2021/0009* (2013.01); *B60R 2021/0032* (2013.01)

(58) Field of Classification Search
  USPC .................................................. 280/731, 777
  See application file for complete search history.

(56) References Cited

U.S. PATENT DOCUMENTS

| | | | |
|---|---|---|---|
| 4,607,539 A | 8/1986 | Arima et al. | |
| 4,867,003 A | 9/1989 | Beauch et al. | |
| 4,932,285 A | 6/1990 | Tsukamoto | |
| 5,152,358 A * | 10/1992 | Kozuka | B60K 35/00 180/78 |
| 5,558,365 A * | 9/1996 | Oe | B60R 21/2032 280/731 |
| 5,562,307 A | 10/1996 | Connor | |
| 5,605,352 A | 2/1997 | Riefe et al. | |
| 5,947,514 A * | 9/1999 | Keller | B60R 21/01512 280/735 |
| 6,149,188 A | 11/2000 | Simpson et al. | |
| 6,893,044 B2 | 5/2005 | Holmes et al. | |
| 7,350,806 B2 | 4/2008 | Ridolfi et al. | |
| 7,380,828 B2 | 6/2008 | Menjak et al. | |
| 7,510,213 B2 | 3/2009 | Manwaring et al. | |
| 9,738,243 B2 * | 8/2017 | Fukawatase | B60R 21/233 |
| 2008/0277178 A1 | 11/2008 | Poli et al. | |
| 2009/0152840 A1 * | 6/2009 | Choi | B60R 21/2032 280/728.2 |
| 2010/0031768 A1 | 2/2010 | Oshita et al. | |

FOREIGN PATENT DOCUMENTS

| | | |
|---|---|---|
| JP | 2008-179173 A | 8/2008 |
| KR | 20-1998-0030815 U | 8/1998 |
| KR | 10-0471876 B1 | 3/2005 |
| WO | 2006/103553 A1 | 10/2006 |

\* cited by examiner

OBLIQUE-IMPACT COLLISION

FRONTAL-IMPACT COLLISION

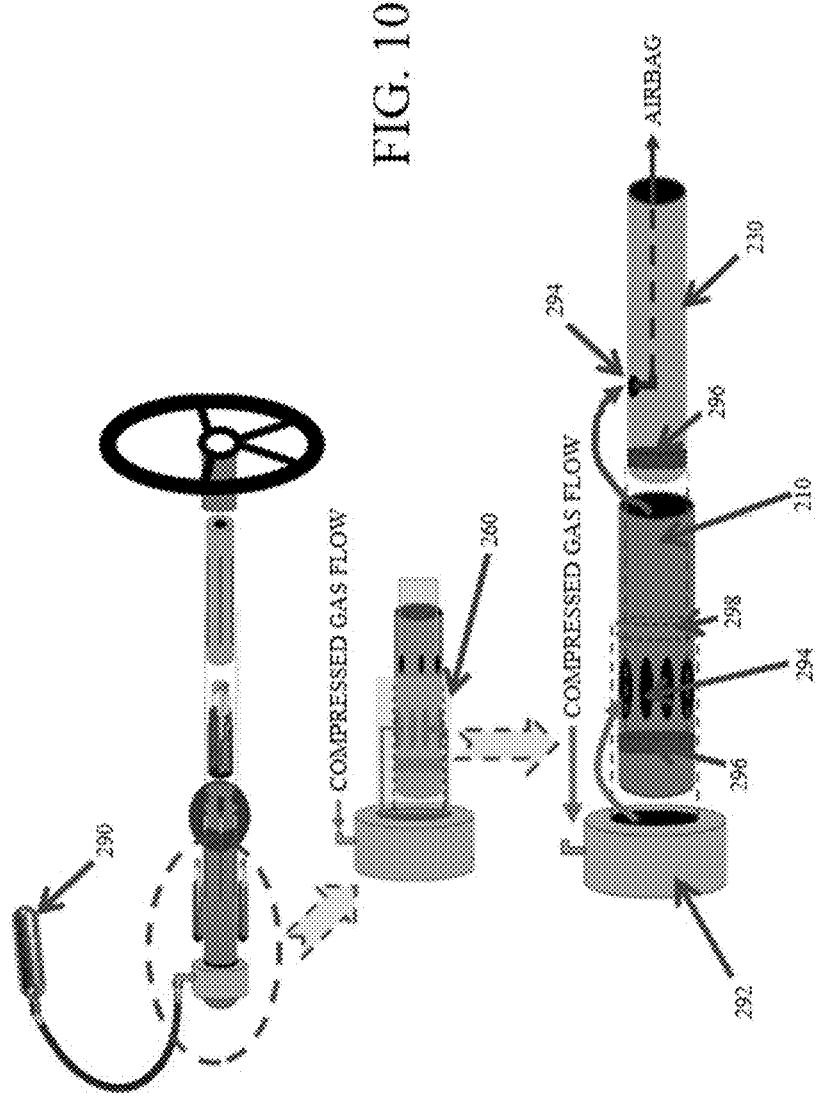

STEERING COLUMN SYSTEM FOR VEHICLE OCCUPANT SAFETY

BACKGROUND (a) Technical Field

The present disclosure relates generally to vehicular safety, and more particularly, to a steering column system for enhanced vehicle occupant safety.

(b) Background Art

Crash tests are a form of destructive testing usually performed in order to ensure safe design standards for various modes of transportation including, primarily, vehicles. There are different types of crash testing—administered in the United States by the National Highway Transportation Safety Administration (NHTSA)—for evaluating different aspects of a vehicle's crashworthiness. The most traditional crash test is known as a "frontal-impact crash test," whereby a vehicle is driven to collide head-on with a barrier, such as a concrete wall. FIG. 1A illustrates an example frontal-impact crash test, in which the angle of impact directly opposes the direction in which the vehicle 100 travels. In this case, a load generated by colliding with the barrier 110 is experienced throughout the entire front end of the vehicle 100. Meanwhile, in "overlap crash tests," only part of the front end of a vehicle impacts a barrier. The impact force remains approximately the same as in a frontal-impact test, but a smaller fraction of the vehicle is required to absorb the force.

Recently, the NHTSA proposed a new "oblique frontal crash test," where a vehicle is struck by a barrier (e.g., a Research Movable Deformable Barrier (RMDB)) at an angle that is offset from the direction in which the vehicle travels.

Notably, in oblique frontal collisions, where the primary loading is not experienced throughout the entire front end of the vehicle, the lateral acceleration of the collision will cause an occupant (e.g., driver, passenger, etc.) to move toward the Principal Direction of Force (PDOF), causing both forward and lateral motion of the driver, as shown in FIG. 2. If the PDOF is far enough off-center, an occupant may load the traditional frontal restraints (e.g., airbag system) in a manner not represented in current regulatory testing. Indeed, recent oblique collision testing has shown that a primary frontal airbag system alone has failed to adequately protect a driver where kinematics of the driver have significant lateral input, propelling the driver between the conventional driver-side airbag, and causing the driver to strike the dash panel in an unsafe manner. Thus, traditional frontal restraints may not provide a sufficient level of protection for the occupant in the event of an oblique frontal collision, as they would if loaded in a more traditional regulatory loading condition, such as a head-on collision.

Some vehicles may be equipped with a curtain airbag (CAB) to provide additional protection to the head and/or upper body of the driver in frontal impacts with significant lateral input. The CAB typically inflates from the front of the driver-side door rearwardly to the rear passenger door. In order for the CAB to provide adequate head protection in the oblique impact shown in FIG. 1B, the bag must be made to be wider, longer, or with some tethering to create a "pocket" for restraining the upper torso. However, these CAB designs are limited by inflation pressures, timing, and packaging concerns due to the addition of extra material.

Other shortcomings in conventional vehicle protection systems exist, such as airbag inflators which often use a pyrotechnic solid (e.g., sodium azide). However, the resultant gas has a high temperature, and as it exits the airbag through the vents formed therein, it may cause a burn hazard to the passenger's hands. Further, conventional energy-absorbing mechanisms in steering columns for absorbing energy during a collision event typically employ bending, elongation, or tearing of metal. However, due to variations in metal chemistry, processing, and geometry, these mechanisms are often vulnerable to performance variations, including the potential for interruptions to smooth load transfer. Off-axis loading of the steering column can result in interference with the resultant sliding motion of the steering column, which is necessary for safely handling loads caused by a collision.

SUMMARY OF THE DISCLOSURE

The present disclosure provides a steering column system in which a central driver-side airbag (DAB) shaft extends along a rotatable steering shaft of the vehicle. The DAB shaft can be held in a stationary manner by a magnetic assembly. A DAB module containing an airbag is connected to a proximal end of the DAB shaft within a central area of a steering wheel that is connected to a proximal end of the rotatable steering shaft. The steering wheel and DAB module are de-coupled to one another and do not interact with each other. As a result, the DAB module remains fixed even as the steering wheel rotates about the module. To provide enhanced protection for the head and/or upper body of a driver during a frontal impact with significant lateral input, the airbag can be formed to have a substantially circular center chamber and a pair of side extension chambers which respectively extend from a right and left side of the center chamber.

According to embodiments of the present disclosure, a steering column system of a vehicle includes: a rotatable, hollow steering shaft that has a proximal end attached to a steering wheel and is configured to transfer rotational input at the steering wheel to a steering rack of the vehicle; a stationary driver-side airbag (DAB) shaft that is surrounded by the steering shaft and extends along the steering shaft; and a DAB module that contains an airbag and is fixedly mounted to a proximal end of the DAB shaft within a region of the steering wheel. The airbag contained in the DAB module is formed to have a substantially circular center chamber and a pair of side extension chambers, one of the side extension chambers disposed on a right side of the center chamber, and the other of the side extension chambers disposed on a left side of the center chamber.

The inflation of the side extension chambers may occur more slowly than inflation of the center chamber. Further, the side extension chambers may remain inflated for a longer period than the center chamber. End portions of the side extension chambers may be curved toward a driver of the vehicle when the airbag is inflated. In addition, one or more gas vents may be disposed on the airbag to allow for compressed gas used to inflate the airbag to exit the airbag.

A magnetic assembly may be configured to hold the DAB shaft in a stationary manner. In this regard, the magnetic assembly may include: one or more interior magnets disposed inside of the steering shaft and one or more exterior magnets disposed outside of the steering shaft positioned to be in alignment with the one or more interior magnets. The one or more interior magnets may be embedded in an outer portion of the DAB shaft. The one or more exterior magnets may be mounted to an outer surface of a stationary outer shaft assembly that encloses the steering shaft and the DAB shaft.

Meanwhile, the steering wheel and the steering shaft may be configured to rotate independently of the DAB module and the DAB shaft, respectively. The DAB module may be fixedly mounted at a central region of the steering wheel. The DAB module may also remain in a fixed position while the steering wheel rotates about the DAB module. Further, the proximal end of the steering shaft may be directly attached to the steering wheel. The steering wheel may not be attached to the DAB module.

In addition, a spacing component may be disposed along an interior of the steering shaft to prevent contact between the DAB shaft and the steering shaft. The steering shaft may also include an upper portion and a lower portion connected together via a breakaway mechanism which allows the upper portion and the lower portion to separate from one another during a collision event. An energy absorbing component may be disposed near a location where the upper portion connects to the lower portion for absorbing energy during a collision event.

The steering column system may further include a stationary outer shaft assembly that encloses the steering shaft and the DAB shaft. A spacing component may be disposed along an interior of the outer shaft assembly to prevent contact between the outer shaft assembly and the steering shaft or the DAB shaft.

The steering column system may further include one or more internal energy absorbing components that are disposed inside of the steering shaft for absorbing energy during a collision event. The steering column system may additionally include one or more external energy absorbing components that are disposed outside of the steering shaft for absorbing energy during a collision event.

Furthermore, the DAB shaft may be substantially hollow and allow for passage of compressed air therethrough to inflate the airbag contained in the DAB module. In this regard, the steering column system may further include a compressed gas assembly that is configured to supply compressed gas to the substantially hollow DAB shaft. Moreover, the steering column system may further include a compressed gas transfer member that is disposed around gas portals formed in the steering shaft and configured to receive compressed gas from the compressed gas assembly and to transfer the received compressed gas into the steering shaft through the gas portals. An inlet may be formed in the DAB shaft to receive compressed gas flowing through the steering shaft.

Furthermore, according to embodiments of the present disclosure, a steering column system of a vehicle includes: a rotatable, hollow steering shaft that has a proximal end attached to a steering wheel and is configured to transfer rotational input at the steering wheel to a steering rack of the vehicle; a stationary driver-side airbag (DAB) shaft that is surrounded by the steering shaft and extends along the steering shaft; a DAB module that contains an airbag and is fixedly mounted to a proximal end of the DAB shaft within a region of the steering wheel; and a magnetic assembly that is configured to hold the DAB shaft in a stationary manner, wherein the magnetic assembly includes one or more interior magnets disposed inside of the steering shaft and one or more exterior magnets disposed outside of the steering shaft positioned to be in alignment with the one or more interior magnets.

The one or more interior magnets may be embedded in an outer portion of the DAB shaft, and the one or more exterior magnets may be mounted to an outer surface of a stationary outer shaft assembly that encloses the steering shaft and the DAB shaft.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 10 illustrates multiple side views of a compressed gas assembly operating in the steering column system for enhanced vehicle occupant safety.

Figure 1B:
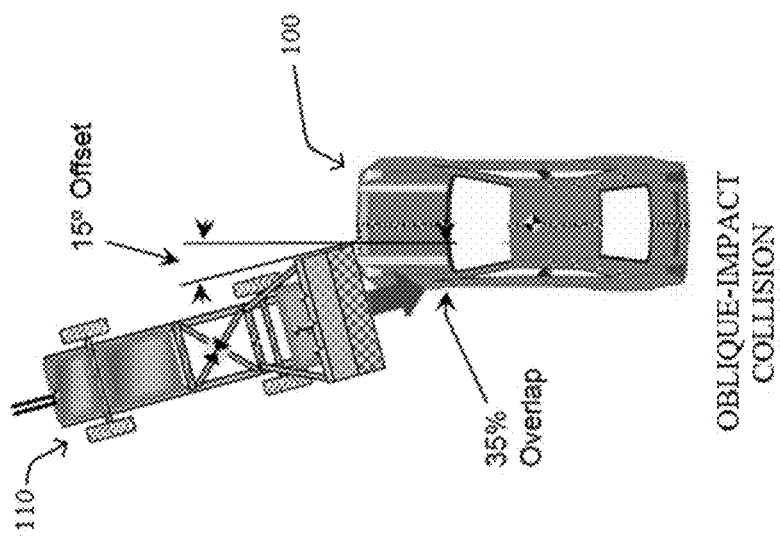
FIGS. 1A and 1B illustrate example collision testing.
Figure 1A:
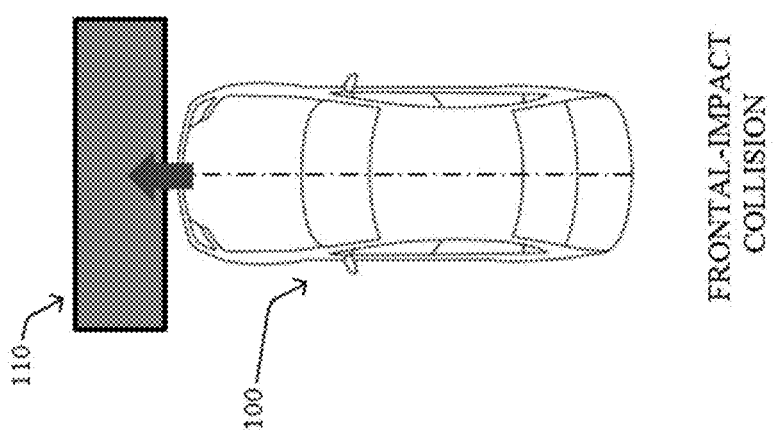

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Referring now to embodiments of the present disclosure, a vehicle may include a steering column system in which a central driver-side airbag (DAB) shaft extends along a rotatable steering shaft of the vehicle. The DAB shaft can be held in a stationary manner by a magnetic assembly. A DAB module containing an airbag is connected to a proximal end of the DAB shaft within a central area of a steering wheel that is connected to a proximal end of the rotatable steering shaft. The steering wheel and DAB module are de-coupled to one another and do not interact with each other. As a result, the DAB module remains fixed even as the steering wheel rotates about the module. To provide enhanced protection for the head and/or upper body of a driver during a frontal impact with significant lateral input, the airbag can be formed to have a substantially circular center chamber and a pair of side extension chambers which respectively extend from a right and left side of the center chamber.

Figure 3:
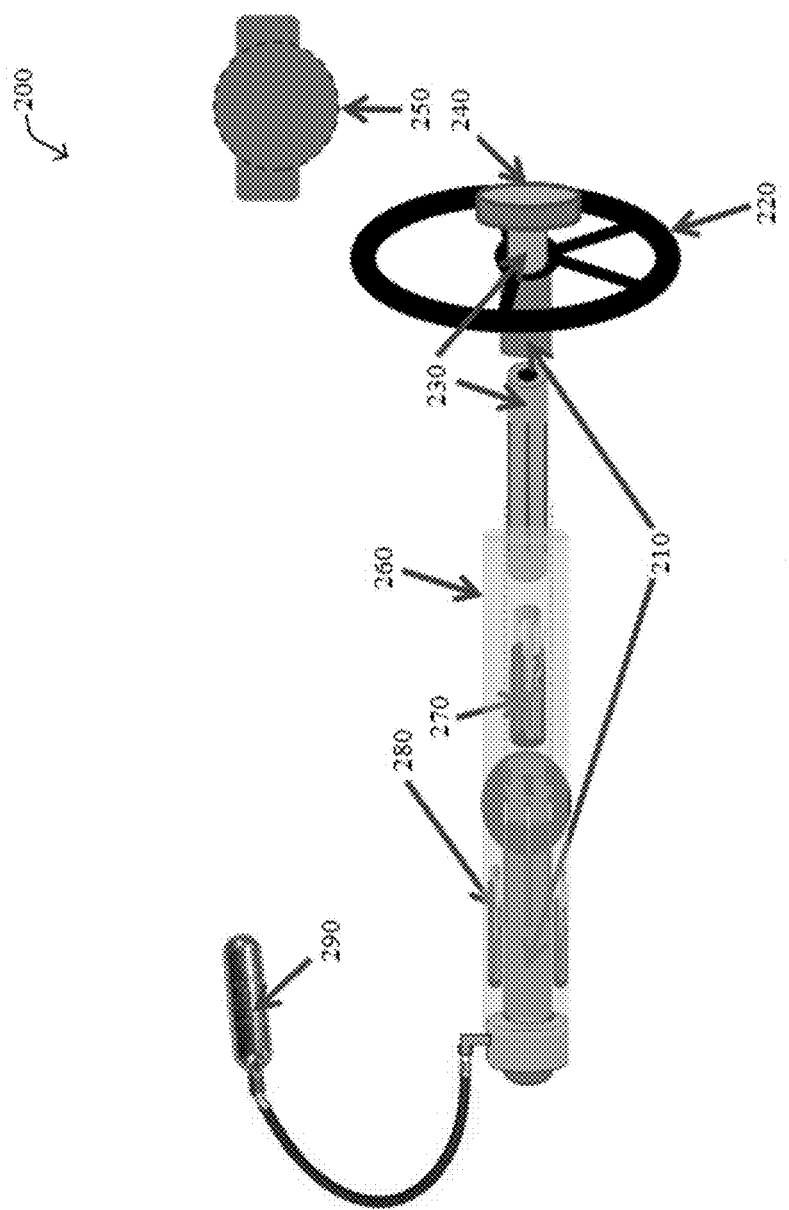
FIG. 3 illustrates an example side view of a steering column system for enhanced vehicle occupant safety according to embodiments of the present disclosure.

FIG. 3 illustrates an example side view of a steering column system for enhanced vehicle occupant safety according to embodiments of the present disclosure. As shown in FIG. 3, a steering column system 200 may include a rotatable steering shaft 210 having a proximal end attached to a steering wheel 220. The proximal end of the steering shaft 210 may be directly attached to the steering wheel 220. The steering shaft 210 may be configured to transfer rotational input at the steering wheel 220 to a steering rack (not shown) of the vehicle. The steering wheel 220 can be freely rotated by a driver of the vehicle, thus rotating the steering shaft 210 correspondingly, as is generally known in the art.

The steering column system may also include a DAB shaft 230 that is stationary (i.e., does not rotate) and extends along the steering shaft 210. The DAB shaft 230 may be securely mounted at a distal end thereof to the vehicle, e.g., a body of the vehicle or an instrument panel of the vehicle, to prevent movement or rotation. Alternatively, the DAB shaft 230 may be held in a stationary manner by a magnetic assembly, including one or more interior magnets imbedded in the DAB shaft 230 and one or more exterior magnets disposed outside of the steering shaft 210 in alignment with the one or more interior magnets, as described in further detail below. Furthermore, the steering shaft 210 may be formed to be hollow and may substantially surround the DAB shaft 230. That is, the DAB shaft 230 may be positioned inside of a hollow steering shaft 210. One or more spacing components, such as needle bearings or the like, may be disposed along an interior of the steering shaft 210 to separate the DAB shaft 230 from the steering shaft 210 and to prevent contact friction between the two shafts, as described in further detail below.

A DAB module 240 may be fixedly mounted to a proximal end of the DAB shaft 230, such that the module 240 is located within a region of the steering wheel 220. The DAB module 240 may contain an airbag 250 that is deployed upon a collision being sensed at the vehicle, as is generally known in the art. The DAB module 240 may be positioned to oppose a driver of the vehicle during the use of the vehicle, such that the airbag 250 contained in the DAB module 240 effectively cushions the driver from impact in the event of a collision.

Notably, the steering wheel 220 and the DAB module 240 may be de-coupled components which do not interact with one another. That is, the steering wheel 220 may not be attached to the DAB module 240. As a result, the DAB module 240 can remain in a fixed position while the steering wheel 220 rotates about the DAB module 240. Additionally, the steering shaft 210 and DAB shaft 220 may be de-coupled components which do not interact with one another. Therefore, the steering wheel 220 and the steering shaft 210 can rotate independently of the DAB module 240 and the DAB shaft 220, respectively.

Figure 4:
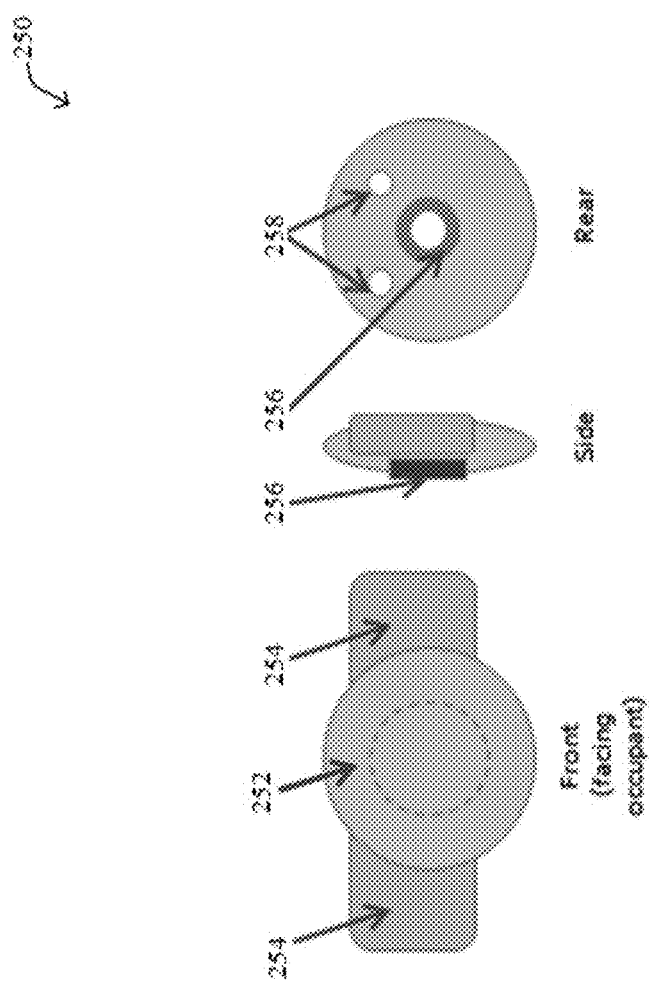
FIG. 4 illustrates example perspectives of an enhanced airbag configuration according to embodiments of the present disclosure.

The airbag 250 may be formed to have a substantially circular center chamber and a pair of side extension chambers which respectively extend from a right and left side of the center chamber in order to provide improved oblique protection. In this regard, FIG. 4 illustrates example perspectives of an enhanced airbag configuration according to embodiments of the present disclosure. As shown in FIG. 4, the airbag 250 may include a primary center chamber 252 with side extension chambers 254 disposed on the right and left side of the center chamber 252. The center chamber 252 may be formed as a conventional, substantially circular cushion providing adequate support for the driver in the event of a frontal collision. The airbag 250 may receive compressed gas (e.g., provided from a compressed gas assembly) via a compressed gas entrance 256 formed in a rear portion of the center chamber 252 during deployment of the airbag 250. The received compressed gas may exit the airbag 250 via gas vents 258 formed in the rear portion of the center chamber 252 after deployment of the airbag 250. By using compressed gas to inflate the airbag 250, as described in further detail below, the gas can exit the gas vents 258 at a lower temperature, thereby reducing burns to the hands of the driver.

Figure 2:
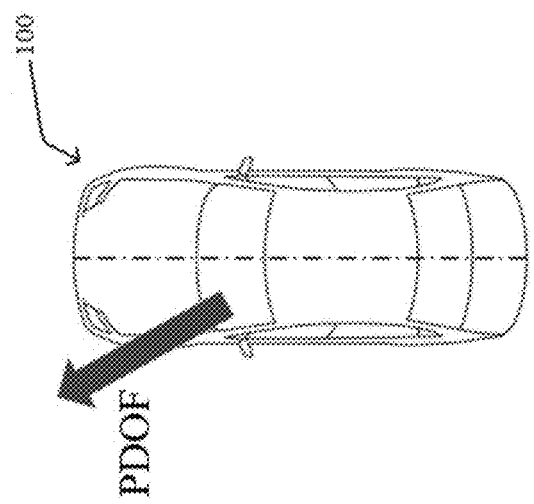
FIG. 2 illustrates an example of vehicle occupant kinematics in response to an oblique collision.

Because the center chamber 252 may not sufficiently protect the driver in the event of an oblique collision, as shown in FIG. 2, a pair of side extension chambers 254 may extend from the right and left sides of the center chamber 252, respectively, to provide additional protection to the head and/or upper body of the driver from striking a hard surface in the event of such a collision, where significant lateral inputs are present. The side extension chambers 254 increase the protective width of the airbag 250 and thus allows for a center chamber 252 with a smaller circumference. In addition, when the airbag 250 is deployed (i.e., inflated), the side extension chambers 254 may be contoured such that the ends thereof are slightly curved toward the driver. The contours can be optimized to constrain the head and/or upper torso of the driver in order to minimize potential for harmful bodily contact and resultant head, neck, and thorax injuries.

Inflation of the side extension chambers 254 may occur more slowly than inflation of the center chamber 252. As such, the side extension chambers 254 may maintain pressure longer than the center chamber 252 in order to fill the void between a curtain air bag (CAB) and the center chamber 252 during off-center frontal collisions (i.e., oblique collisions). Such a configuration can be advantageous when faced with an oblique collision, as the period before the head of the driver potentially comes into proximity with a hard surface takes place over a longer period of time in frontal crashes with lateral impacts than in head-on crashes.

Referring again to FIG. 3, the steering column system 200 may further include an outer shaft assembly 260 that encloses the steering shaft 210 and the DAB shaft 230. The outer shaft assembly 260 may act as a housing for the steering shaft 210 and the DAB shaft 230. The outer shaft assembly 260 may be mounted to the vehicle, e.g., a body of the vehicle or an instrument panel of the vehicle, and may be responsible for the required steering column loads and the tilt or telescoping requirements of the steering shaft 210 and steering wheel 220. Further, one or more spacing components, such as needle bearings or the like, may be disposed along an interior of the outer shaft assembly 260 to separate the outer shaft assembly 260 from the DAB shaft 230 and/or the steering shaft 210 and to prevent contact friction between the outer shaft assembly 260 and the DAB shaft 230 and/or the steering shaft 210, as described in further detail below.

Additionally, one or more energy absorbing components may be disposed within the steering column system 200 for absorbing energy during a collision event. For instance, one or more internal energy absorbing components 270 may be disposed within an interior of the steering shaft 210. Additionally, or alternatively, one or more external energy absorbing components 280 may be mounted outside of the steering shaft 210, e.g., to a body of the vehicle or an instrument panel of the vehicle. As an example, hydraulic/air energy absorbers or compressible metal foam may be utilized as energy absorbing components. As such, the energy absorbing components disclosed herein replace conventional mechanisms that absorb occupant energy through the tearing or unrolling of metal components. The energy absorbing components can be implemented to provide additional protection for the occupant during loading conditions of a collision event.

Furthermore, a compressed gas assembly can be used for DAB module 240 inflation. The compressed gas assembly may include a compressed gas providing member 290 which is mounted remotely of the DAB shaft 230, as shown in FIG. 3, and coupled to the steering column system 200 via a tube or other similar coupling means. In this case, the DAB shaft 230 may be substantially hollow to allow for passage of compressed gas provided from the compressed gas assembly to the DAB module 240. Therefore, compressed gas may be provided directly to the DAB module 240 through the DAB shaft 230 in order to deploy the airbag in the event of a collision. The compressed gas system disclosed herein replaces the use of conventional solid propellants, such as sodium azide.

The steering column system 200 may further include a gear assembly (not shown) mounted at a distal end of the steering shaft 210 to transfer rotational input at the steering wheel 220 to the steering rack (not shown). The gear assembly may include a set of helical gears. A first gear of the set of helical gears may be integrally formed with the steering shaft 210, and a second gear of the set of helical gears may be coupled to the first gear and not integrally formed with the steering shaft 210.

Figure 5:
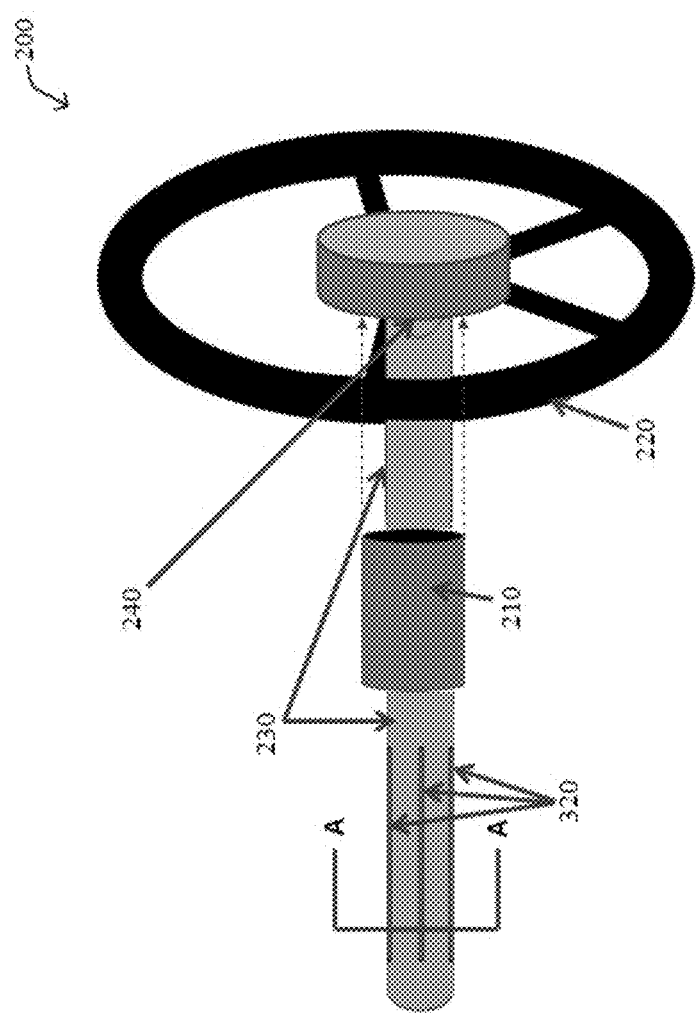
FIG. 5 illustrates an example side view of inner components of the steering column system for enhanced vehicle occupant safety.

FIG. 5 illustrates an example side view of inner components of the steering column system for enhanced vehicle occupant safety. As shown in FIG. 5, the inner components of the steering column system 200 include, for example, steering shaft 210, which is connected to the steering wheel 220, and DAB shaft 230, which is connected to the DAB module 240.

The DAB shaft 230 may be secured by a magnetic assembly 300 in order to maintain the DAB module 240 in a fixed, non-rotational position. The magnetic assembly 300 may include one or more exterior magnets 310 and one or more interior magnets 320, as described in further detail with respect to FIGS. 6 and 7. In the alternative, a distal end of the DAB shaft 230 may be secured to the vehicle body or the underside of an instrument panel, as an example. A proximal end of the DAB shaft 230 may be attached to the DAB module 240.

Meanwhile, the steering shaft 210 may connect to the steering wheel 220 and translate rotational input from the driver to lower gears (not shown) and the steering rack (not shown) of the vehicle. The steering shaft 210 and the DAB shaft 230 may extend in directions parallel to one another. More specifically, the steering shaft 210 may be hollow, allowing for the DAB shaft 230 to extend therethrough such that the steering shaft 210 substantially surrounds the DAB shaft 230. One or more spacing components 330, such as needle bearings or other similar components, may be used to separate the steering shaft 210 from the DAB shaft 230 and reduce contact friction therebetween.

Because the steering shaft 210, which connects to the steering wheel 220, and the DAB shaft 230, which connects to the DAB module 240, do not interact with one another, that is, the steering shaft 210 and the DAB shaft 230 are not coupled components, rotation of the steering shaft 210 does not affect the stationary DAB shaft 230. Therefore, the steering wheel 220 and DAB module 240 are also not interactive components, which allows DAB module 240 to remain in a fixed position, even as the steering wheel 220 is rotated while the vehicle is being driven. Advantageously, the design of the steering column system 200 becomes increasingly flexible, as compared to conventional steering column systems, and vehicle occupant safety can be enhanced.

Figure 6:
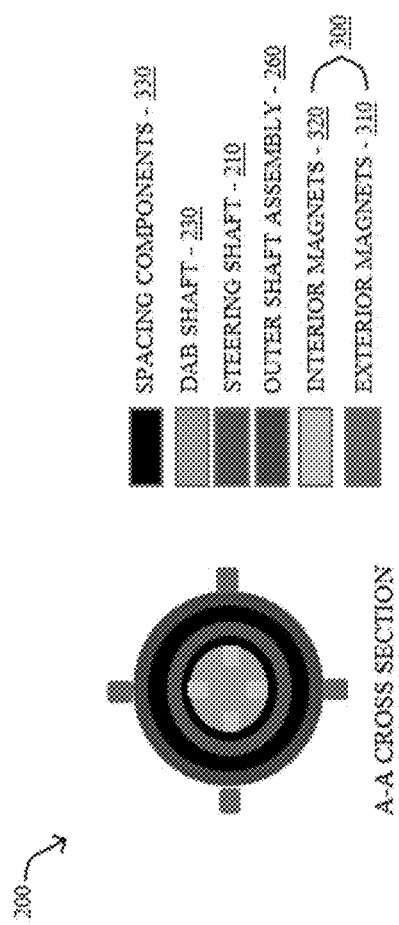
FIG. 6 illustrates an example cross-sectional perspective of the steering column system for enhanced vehicle occupant safety taken along the line A-A shown in FIG. 5.

FIG. 6 illustrates an example cross-sectional perspective of the steering column system for enhanced vehicle occupant safety taken along the line A-A shown in FIG. 5. As shown in FIG. 6, the stationary DAB shaft may be substantially surrounded by the steering shaft 210 and the outer shaft assembly 260 in order from inside to outside. One or more spacing components 330 can separate the DAB shaft 230 from the steering shaft 210 and separate the steering shaft 210 from the outer shaft assembly 260 to prevent contact causing friction therebetween, thus allowing for smooth, unimpeded movement of the various shaft components. The spacing components 330 also keep the shaft components in place relative to each other during the loading of the shaft components in the event of a collision. The spacing components 330 may include ball bearings (non-magnetic), needle bearings, or other objects capable of reducing friction between the shaft components.

Additionally, the steering column system 200 may include a magnetic assembly 300 that holds the DAB shaft 230 in a stationary manner. In this regard, the magnetic assembly 300 may include multiple magnets disposed throughout the steering column system 200 to hold the DAB shaft 230 in place. For instance, as shown in FIG. 6, the magnetic assembly 300 may include one or more interior magnets 320 disposed inside of the steering shaft 210 and one or more exterior magnets 310 disposed outside of the steering shaft 210 positioned to be in alignment with the one or more interior magnets 320. More specifically, the interior magnets 320 may be imbedded in an outer portion of the DAB shaft 230. The interior magnets 320 may be flush with the outer surface of the DAB shaft 230. Meanwhile, the exterior magnets 310 may be mounted (e.g., rigidly attached) to an outer surface of the outer shaft assembly 260 that encloses the steering shaft 210 and the DAB shaft 230. In some configurations, the interior magnets 320 may include rare earth, high-power (i.e., permanent) magnets. Meanwhile, the exterior magnets 310 may include rare earth electromagnetic magnets. The magnetic assembly 300 may include additional sets of magnets disposed throughout the steering column system 200, as well.

Because the interior magnets 320 and exterior magnets 310 are positioned so as to be aligned with one another, while the interior magnets 320 are imbedded in the DAB shaft 230, the DAB shaft 230 can effectively be locked in place due to the magnetic attraction between the two sets of magnets. For instance, the interior magnets 320 and exterior magnets 310 may be positioned in polarity to center the DAB shaft 230 to the "zero degrees" steering position. However, the DAB shaft 230 may break free from the magnetic assembly 300 during high-speed frontal impacts, using the energy absorbing components equipped in the steering column system 200 to control force and/or displacement.

Figure 7:
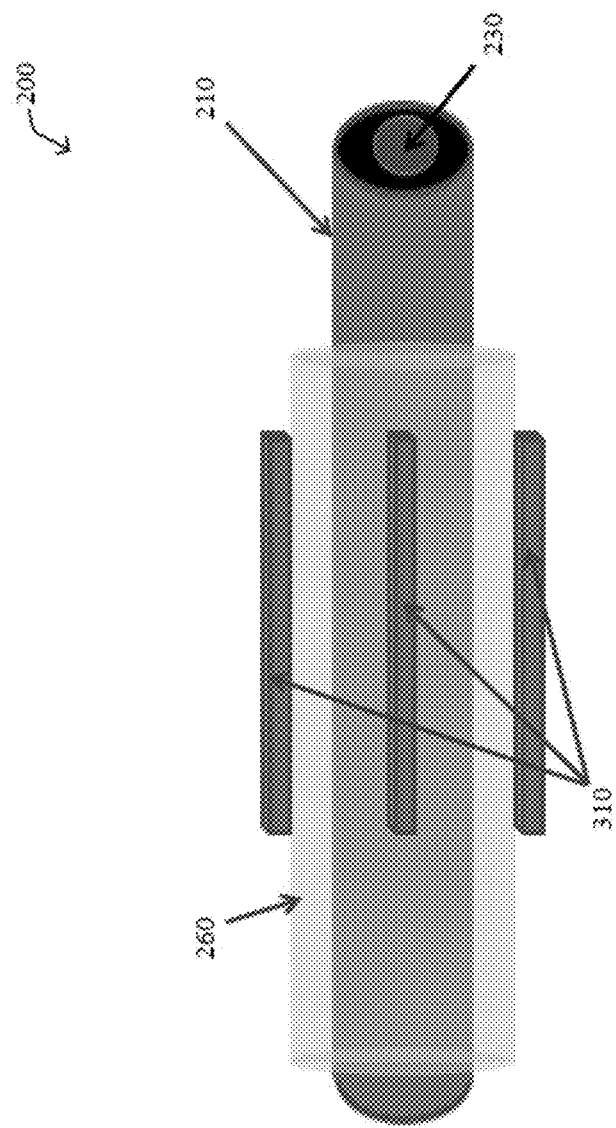
FIG. 7 illustrates an additional side view of the steering column system for enhanced vehicle occupant safety including a magnetic assembly.

FIG. 7 illustrates an additional side view of the steering column system for enhanced vehicle occupant safety including a magnetic assembly. As shown in FIG. 7, exterior magnets 310 are mounted to an outer surface of the outer shaft assembly 260 which surrounds the steering shaft 210 and the DAB shaft 230. The magnets of the magnetic assembly 300 may be longitudinally disposed in the steering column system 200, for example, as shown in FIG. 7. Further, exterior magnets 310 may be disposed along multiple sections of the outer shaft assembly 260, and similarly, interior magnets 320 may be imbedded in multiple sections of the DAB shaft 230 to match the exterior magnets 310. Thus, FIG. 7 illustrates only a single section of the steering shaft 210, DAB shaft 230, and outer shaft assembly 260.

Figure 8:
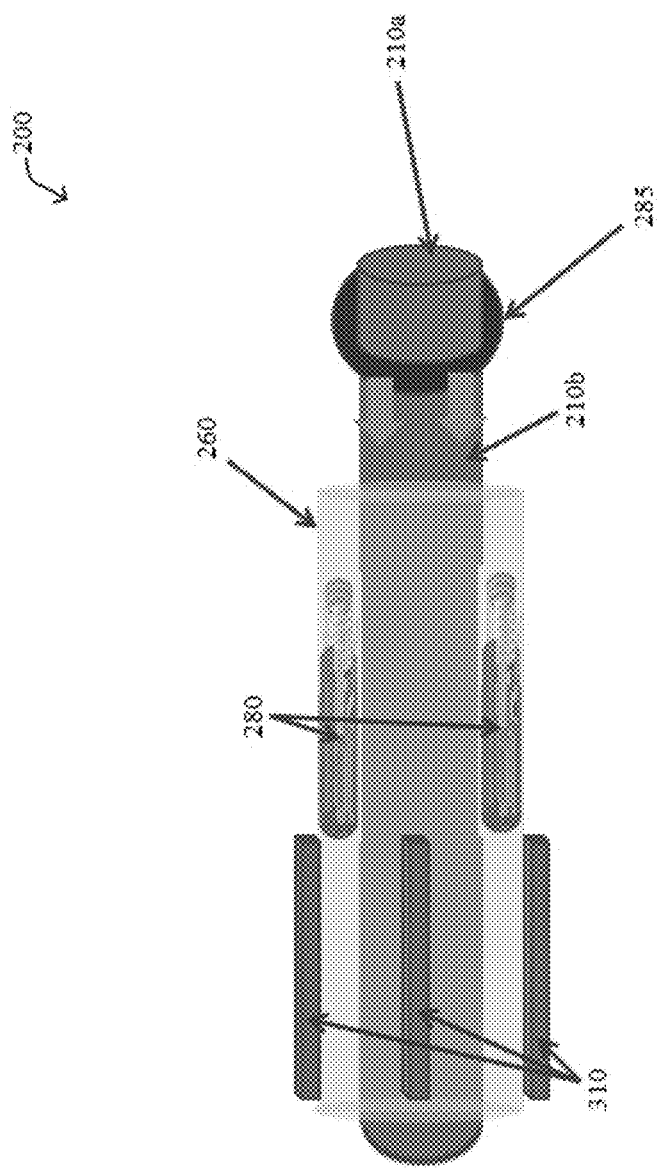
FIG. 8 illustrates an example side view of energy absorbing components of the steering column system for enhanced vehicle occupant safety.

As shown in FIG. 8, the steering column system 200 may include one or more energy absorbing components (e.g., internal energy absorbing components 270, external energy absorbing components 280, energy absorbing disk 285, etc.) for absorbing energy during a collision event occurring at the vehicle. The energy absorbing components may include, for instance, a hydraulic or pneumatic piston-like mechanism or a gas/oil-based shock absorber for energy absorption. Alternatively, or additionally, energy absorbing components may include crushable metal foam mechanisms, rather than the metal tearing/shaping mechanisms implemented in conventional steering columns. The energy absorbing components may be tuned by the steering column system designer in view of loading needs based on factors such as occupant characteristics (e.g., mass), seat belt usage, collision types, and the like.

The energy absorbing components in the steering column system 200 may include, for instance, one or more internal energy absorbing components 270 that are disposed inside of the steering shaft 210 and/or one or more external energy absorbing components 280 that are disposed outside of the steering shaft 210. More specifically, the internal energy absorbing components 270 may be disposed inside the DAB shaft 230 for absorbing energy affecting the DAB shaft 230, while the external absorbing components 280 may be mounted to an interior surface of the outer shaft assembly 260 or to an external surface of the steering shaft 210 for absorbing energy affecting the outer shaft assembly 260 and/or steering shaft 210. The external energy absorbing components 280 may provide force/displacement performance tuned to complement the internal energy absorbing components 270 for the stationary DAB shaft 230.

The energy absorbing components may further include an energy absorbing disk 285 which may be disposed along the steering shaft 230. More specifically, the energy absorbing disk 285 may be disposed at a location where an upper portion of the steering shaft 210a is coupled to a lower portion of the steering shaft 210b (e.g., attached to one of the upper portion 210a and the lower portion 210b), as shown in FIG. 8. The energy absorbing disk 285 can interact with the external energy absorbing components 280, which may be configured to absorb energy from the energy absorbing disk 285 when the steering shaft 210 is shifted downwardly as a result of high loads on the steering wheel 220 during a collision event.

Figure 9:
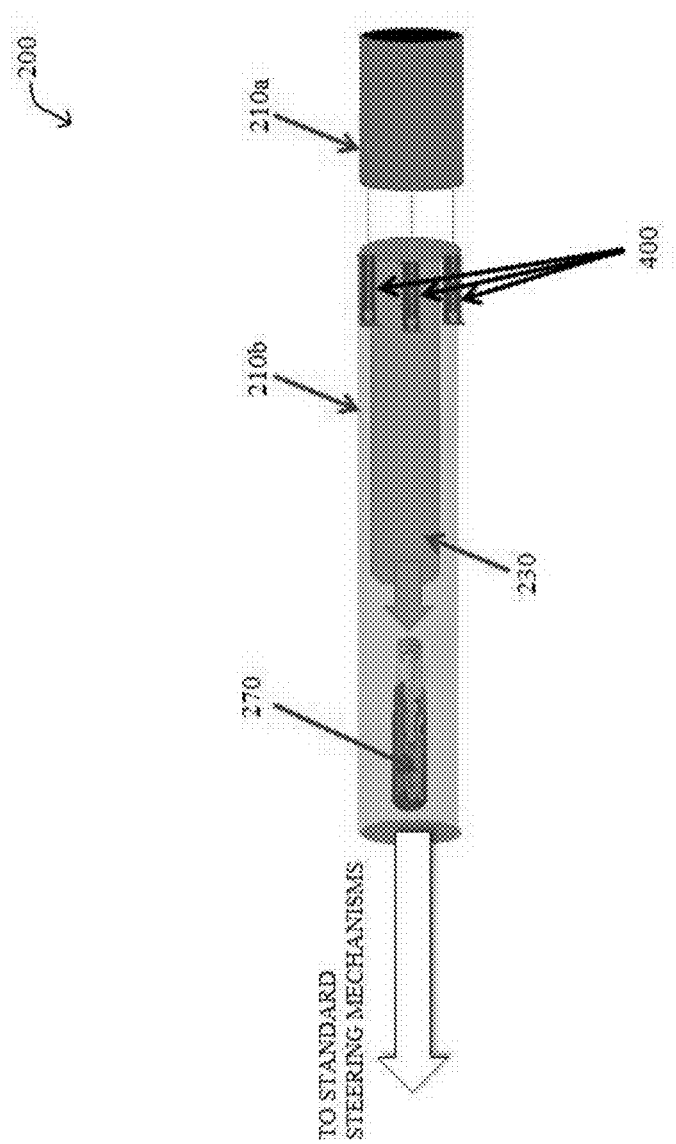
FIG. 9 illustrates an example side view of upper and lower sections of the steering shaft in the steering column system for enhanced vehicle occupant safety.

FIG. 9 illustrates an example side view of upper and lower sections of the steering shaft in the steering column system for enhanced vehicle occupant safety. As shown in FIG. 9, the steering shaft 210, which rotates with the steering wheel 220, surrounds the DAB shaft 230 and is coupled at its distal (i.e., lower) end to standard steering mechanisms, such as a steering rack (not shown) and the like. An interior energy absorbing component 270 may be disposed within the DAB shaft 230 to absorb energy affecting the DAB shaft 230 during a collision event.

In addition, as mentioned above, the steering shaft 210 may be separated into multiple sections, e.g., a lower section 210b coupled to the standard steering mechanisms and an upper section 210a connected to the steering wheel 220, which are attached to one another. The sections may be configured such that the upper section of the steering shaft 210a may overlap the lower section of the steering shaft 210b. Thus, the upper section 210a can break free from the lower section 210b and shift downwardly (i.e., over the lower section 210b) under heavy loading resulting from frontal collisions.

One or more breakaway mechanisms 400 may be used to attach the upper section of the steering shaft 210a to the lower section of the steering shaft 210b. The breakaway mechanisms 400 can hold the upper section 210a and lower section 210b together and allow the upper section 210a to break away from the lower section 210b and move downwardly when a heavy load is placed on the steering wheel 220 during a collision event. As shown in FIG. 8, the energy absorbing disk 285 may be disposed in a location proximate to the breakaway mechanisms 400.

FIG. 10 illustrates multiple side views of a compressed gas assembly operating in the steering column system for enhanced vehicle occupant safety. An example procedure by which compressed gas flows through the steering column system 200 to inflate the airbag 250 contained in the DAB module 240 is demonstrated.

A compressed gas assembly, as shown in FIG. 10, can be used for DAB module 240 inflation. The compressed gas assembly may include at least a compressed gas providing member 290 mounted remotely of the DAB shaft 230 (e.g., outside of the outer shaft assembly 260) and coupled to the steering column system 200 via a tube or other similar coupling means. The compressed gas providing member 290 can provide compressed gas to inflate the airbag 250 contained in the DAB module 240. In this case, the DAB shaft 230 may be substantially hollow to allow for passage of compressed gas provided from the compressed gas assembly to the DAB module 240. Therefore, compressed gas may be provided directly to the DAB module 240 through the DAB shaft 230 in order to deploy the airbag in the event of a collision.

The compressed gas assembly may also include a compressed gas transfer member 292 that is disposed over gas portals 294 formed in the steering shaft 210 and DAB shaft 230. The compressed gas transfer member 292 may be formed as a ring-shaped member that surrounds the steering shaft 210 and DAB shaft 230. The compressed gas transfer member 292 can be configured to receive compressed gas provided from the compressed gas providing member 290 (e.g., see "COMPRESSED GAS FLOW" in FIG. 10) and to transfer the received compressed gas into the steering shaft 210 through the gas portals 294.

A shaft stopper 296 may be disposed inside of the steering shaft 210 and DAB shaft 230 and positioned rearward of the gas portals 294 in order to prevent gas leakage. Meanwhile, a compression ring 298 may be disposed between the steering shaft 210 and DAB shaft 230 and positioned forward of the gas portals 294 in order to further prevent forward gas leakage.

Operationally, compressed gas provided from the compressed gas providing member 290 can flow through an inlet of the compressed gas transfer member 292 and into the steering shaft 210 through the gas portals 294 formed therein. The received compressed gas is then forced through a gas portal 294 (i.e., transfer hole) formed in the DAB shaft 230 which is located within the steering shaft 210. Compressed gas flow is thereby directed to the DAB module 240 for inflation of the airbag 250 in the event of a collision.

Accordingly, the steering column system described herein allows for increased flexibility, simplicity of design, and enhanced protection, as compared to conventional steering column systems. For instance, mounting the DAB module 240 as a fixed center hub on the steering wheel 220 enables new driver airbag configurations that enhance occupant protection in certain frontal crash modes, such as the airbag 250 illustrated in FIG. 4 having side extension members 254 extending outwardly from the center chamber 252 in order to extend the lateral protective reach of the airbag. Further, the fixed hub design can enable designing of controls and displays around the DAB module 240. Even further, the fixed hub design allows for the use of compressed gas for driver airbag inflation, using the compressed gas assembly illustrated in FIG. 10, for example, thereby reducing the risk of burns associated with solid propellants and permitting gas pressure tuning for different occupant conditions.

The steering column system described herein also allows for direct physical connection of the steering wheel 220 to the steering assembly, e.g., steering shaft 210, steering rack, and the like, without the use of complicated gears, chains, or other torque-transfer mechanisms. In addition, use of energy absorbing components described herein (e.g., internal energy absorbing components 270 and/or external energy absorbing components 280) can replace metal deformation techniques for driver loading of the steering assembly, which may also be tuned to match the loading needs based on occupant mass. Furthermore, securing the DAB shaft 230 in place using a magnetic assembly 300, as illustrated in FIGS. 5-7, eliminates the need for mounting the DAB shaft 230 to the vehicle and holds the DAB module 240 attached to the proximal end of the DAB shaft 230 in a fixed rotational position, independent of the angle of the steering wheel 220.

While there have been shown and described illustrative embodiments that provide for a steering column system for enhanced vehicle occupant protection, it is to be understood that various other adaptations and modifications may be made within the spirit and scope of the embodiments disclosed herein. Thus, the disclosed embodiments may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A steering column system of a vehicle comprising:
   a rotatable, hollow steering shaft that has a proximal end attached to a steering wheel and is configured to transfer rotational input at the steering wheel to a steering rack of the vehicle;
   a stationary driver-side airbag (DAB) shaft that is surrounded by the steering shaft and extends along the steering shaft;
   a DAB module that contains an airbag and is fixedly mounted to a proximal end of the DAB shaft within a region of the steering wheel; and
   a magnetic assembly that is configured to hold the DAB shaft in a stationary manner,
   wherein the airbag contained in the DAB module is formed to have a substantially circular center chamber and a pair of side extension chambers, one of the side extension chambers disposed on a right side of the center chamber, and the other of the side extension chambers disposed on a left side of the center chamber.

2. The system of claim 1, wherein inflation of the side extension chambers occurs more slowly than inflation of the center chamber.

3. The system of claim 1, wherein the side extension chambers remain inflated for a longer period than the center chamber.

4. The system of claim 1, wherein end portions of the side extension chambers are curved toward a driver of the vehicle when the airbag is inflated.

5. The system of claim 1, wherein one or more gas vents are disposed on the airbag to allow for compressed gas used to inflate the airbag to exit the airbag.

6. The system of claim 1, wherein the magnetic assembly includes:
   one or more interior magnets disposed inside of the steering shaft, and
   one or more exterior magnets disposed outside of the steering shaft positioned to be in alignment with the one or more interior magnets.

7. The system of claim 6, wherein the one or more interior magnets are embedded in an outer portion of the DAB shaft.

8. The system of claim 6, wherein the one or more exterior magnets are mounted to an outer surface of a stationary outer shaft assembly that encloses the steering shaft and the DAB shaft.

9. The system of claim 1, wherein the steering wheel and the steering shaft are configured to rotate independently of the DAB module and the DAB shaft, respectively.

10. The system of claim 1, wherein the DAB module is fixedly mounted at a central region of the steering wheel.

11. The system of claim 1, wherein the DAB module remains in a fixed position while the steering wheel rotates about the DAB module.

12. The system of claim 1, wherein the proximal end of the steering shaft is directly attached to the steering wheel.

13. The system of claim 1, wherein the steering wheel is attached to the DAB module.

14. The system of claim 1, further comprising:
a spacing component that is disposed along an interior of the steering shaft to prevent contact between the DAB shaft and the steering shaft.

15. The system of claim 1, further comprising:
a stationary outer shaft assembly that encloses the steering shaft and the DAB shaft.

16. The system of claim 15, further comprising:
a spacing component that is disposed along an interior of the outer shaft assembly to prevent contact between the outer shaft assembly and the steering shaft or the DAB shaft.

17. The system of claim 1, further comprising:
one or more internal energy absorbing components that are disposed inside of the steering shaft for absorbing energy during a collision event.

18. The system of claim 1, further comprising:
one or more external energy absorbing components that are disposed outside of the steering shaft for absorbing energy during a collision event.

19. The system of claim 1, wherein the DAB shaft is substantially hollow and allows for passage of compressed air therethrough to inflate the airbag contained in the DAB module.

20. The system of claim 1, further comprising:
a compressed gas assembly that is configured to supply compressed gas to inflate the airbag contained in the DAB module.

21. The system of claim 20, wherein the compressed gas assembly includes:
a compressed gas providing member that provides compressed gas to inflate the airbag; and
a compressed gas transfer member that is disposed around gas portals formed in the steering shaft and configured to receive the compressed gas provided from the compressed gas providing member and to transfer the received compressed gas into the steering shaft through the gas portals.

22. The system of claim 21, wherein an inlet is formed in the DAB shaft to receive compressed gas flowing through the steering shaft.

23. A steering column system of a vehicle comprising:
a rotatable, hollow steering shaft that has a proximal end attached to a steering wheel and is configured to transfer rotational input at the steering wheel to a steering rack of the vehicle;
a stationary driver-side airbag (DAB) shaft that is surrounded by the steering shaft and extends along the steering shaft; and
a DAB module that contains an airbag and is fixedly mounted to a proximal end of the DAB shaft within a region of the steering wheel,
wherein the airbag contained in the DAB module is formed to have a substantially circular center chamber and a pair of side extension chambers, one of the side extension chambers disposed on a right side of the center chamber, and the other of the side extension chambers disposed on a left side of the center chamber, and
wherein the steering shaft includes an upper portion and a lower portion connected together via a breakaway mechanism which allows the upper portion and the lower portion to separate from one another during a collision event.

24. The system of claim 23, further comprising:
an energy absorbing component that is disposed near a location where the upper portion connects to the lower portion for absorbing energy during a collision event.

25. A steering column system of a vehicle comprising:
a rotatable, hollow steering shaft that has a proximal end attached to a steering wheel and is configured to transfer rotational input at the steering wheel to a steering rack of the vehicle;
a stationary driver-side airbag (DAB) shaft that is surrounded by the steering shaft and extends along the steering shaft;
a DAB module that contains an airbag and is fixedly mounted to a proximal end of the DAB shaft within a region of the steering wheel; and
a magnetic assembly that is configured to hold the DAB shaft in a stationary manner, wherein the magnetic assembly includes one or more interior magnets disposed inside of the steering shaft and one or more exterior magnets disposed outside of the steering shaft positioned to be in alignment with the one or more interior magnets.

26. The system of claim 25, wherein the one or more interior magnets are embedded in an outer portion of the DAB shaft.

27. The system of claim 25, wherein the one or more exterior magnets are mounted to an outer surface of a stationary outer shaft assembly that encloses the steering shaft and the DAB shaft.

* * * * *